(12) United States Patent
Freeman et al.

(10) Patent No.: US 6,181,334 B1
(45) Date of Patent: Jan. 30, 2001

(54) COMPRESSED DIGITAL-DATA INTERACTIVE PROGRAM SYSTEM

(75) Inventors: Michael J. Freeman, Kings Point; Gregory W. Harper, New York, both of NY (US)

(73) Assignee: ACTV, Inc., New York, NY (US)

(*) Notice: Under 35 U.S.C. 154(b), the term of this patent shall be extended for 0 days.

(21) Appl. No.: 08/887,314

(22) Filed: Jul. 3, 1997

Related U.S. Application Data

(63) Continuation of application No. 08/443,607, filed on May 18, 1995, now Pat. No. 5,724,091, which is a continuation-in-part of application No. 08/166,608, filed on Dec. 13, 1993, now abandoned, which is a continuation of application No. 07/797,298, filed on Nov. 25, 1991, now abandoned.

(51) Int. Cl.[7] .................................................. H04N 7/10
(52) U.S. Cl. .............................. 345/327; 348/6; 348/10; 348/12
(58) Field of Search .............................. 348/3, 6, 7, 10, 348/8, 12, 13, 721, 734, 561–565; 345/327; 709/217–219

(56) References Cited

U.S. PATENT DOCUMENTS

| Re. 32,776 | 11/1988 | Saylor . |
|---|---|---|
| Re. 34,340 | 8/1993 | Freeman . |
| 2,612,553 | 9/1952 | Homrighous . |
| 2,777,901 | 1/1957 | Dostert . |
| 2,826,828 | 3/1958 | Hamilton . |
| 2,908,767 | 10/1959 | Fritzinger . |
| 2,921,385 | 1/1960 | Hamilton . |
| 3,008,000 | 11/1961 | Morchand . |

(List continued on next page.)

FOREIGN PATENT DOCUMENTS

| 994233 | 6/1965 | (DE) . |
|---|---|---|
| 16314 | 10/1980 | (EP) . |
| 128481 | 12/1984 | (EP) . |
| 314572 | 5/1989 | (EP) . |
| 4207885 | 7/1992 | (JP) . |
| 6165170 | 6/1994 | (JP) . |
| 7-46198 | * 2/1995 | (JP) . |
| 8102961 | 10/1981 | (WO) . |
| 9403851 | 2/1994 | (WO) . |

OTHER PUBLICATIONS

Harless et al., Interactive Video Disc Case Studies for Medical Education, Proceedings, 10th Annual Symposium on Computer Applications in Medical Care, Oct. 25–26, 1986, pp. 183–187.

(List continued on next page.)

* cited by examiner

Primary Examiner—Nathan Flynn
(74) Attorney, Agent, or Firm—Dorsey & Whitney LLP

(57) ABSTRACT

An interactive cable television system is disclosed which utilizes a standard cable television distribution network for simultaneously providing a plurality of viewers with an interactive television program comprising a plurality of signals related in time and content. Video signals are transmitted in a digital format, more than one signal being multiplexed onto a data stream on a single channel. The video signals may be compressed for efficiency. A receiver, in conjunction with a signal selector, selects a particular NTSC channel for playback, then selects a particular video signal from the data stream, and decompresses the video signal for playback. Seamless switching between video signals on different channels is provided. An alternative embodiment is disclosed wherein the various signals which comprise the interactive program are switched at the head end rather than at the receiver. The multiple choice control unit selects a desired signal by relaying the multiple choice selections of the user through a relay box back to a remotely located switching station. The switching station routes the correct video signal down the appropriate cable channel for the particular user.

72 Claims, 7 Drawing Sheets

U.S. PATENT DOCUMENTS

| | | |
|---|---|---|
| 3,020,360 | 2/1962 | Gratian et al. . |
| 3,194,895 | 7/1965 | Treadwell . |
| 3,221,098 | 11/1965 | Feldman et al. . |
| 3,245,157 | 4/1966 | Laviana . |
| 3,255,536 | 6/1966 | Livingston . |
| 3,273,260 | 9/1966 | Walker . |
| 3,284,923 | 11/1966 | Leslie . |
| 3,343,280 | 9/1967 | Tolnai . |
| 3,366,731 | 1/1968 | Wallerstein . |
| 3,387,084 | 6/1968 | Hine et al. . |
| 3,440,342 | 4/1969 | Beltrami . |
| 3,477,144 | 11/1969 | Stillit . |
| 3,484,950 | 12/1969 | Serrell et al. . |
| 3,485,946 | 12/1969 | Jackson et al. . |
| 3,538,621 | 11/1970 | Mayeda . |
| 3,546,791 | 12/1970 | Koos et al. . |
| 3,566,482 | 3/1971 | Morchand . |
| 3,575,861 | 4/1971 | Pratt et al. . |
| 3,602,582 | 8/1971 | Torricelli . |
| 3,623,238 | 11/1971 | Laplume et al. . |
| 3,643,217 | 2/1972 | Morphew et al. . |
| 3,665,615 | 5/1972 | Laplume . |
| 3,708,891 | 1/1973 | Rosov . |
| 3,725,571 | 4/1973 | Justice . |
| 3,730,980 | 5/1973 | Kirk, Jr. . |
| 3,757,225 | 9/1973 | Ulicki . |
| 3,763,377 | 10/1973 | Weston . |
| 3,774,316 | 11/1973 | Meier . |
| 3,814,841 | 6/1974 | Ulicki . |
| 3,825,674 | 7/1974 | Justice . |
| 3,833,760 | 9/1974 | Tickle . |
| 3,849,594 | 11/1974 | Justice . |
| 3,857,999 | 12/1974 | Justice . |
| 3,860,745 | 1/1975 | Takada . |
| 3,902,007 | 8/1975 | Justice . |
| 3,916,092 | 10/1975 | Justice . |
| 3,936,595 | 2/1976 | Yanagimachi et al. . |
| 3,947,972 | 4/1976 | Freeman . |
| 3,988,528 | 10/1976 | Yanagimachi et al. . |
| 3,991,266 | 11/1976 | Baer . |
| 4,034,990 | 7/1977 | Baer . |
| 4,040,088 | 8/1977 | Hannan . |
| 4,044,380 | 8/1977 | Justice et al. . |
| 4,078,316 | 3/1978 | Freeman . |
| 4,199,781 | 4/1980 | Doumit . |
| 4,245,245 | 1/1981 | Matsumoto et al. . |
| 4,264,924 | 4/1981 | Freeman . |
| 4,264,925 | 4/1981 | Freeman et al. . |
| 4,290,142 | 9/1981 | Schnee et al. . |
| 4,292,649 | 9/1981 | Macheboeuf . |
| 4,305,131 | 12/1981 | Best . |
| 4,331,974 | 5/1982 | Cogswell et al. . |
| 4,333,152 | 6/1982 | Best . |
| 4,361,730 | 11/1982 | Barber et al. . |
| 4,381,522 | 4/1983 | Lambert . |
| 4,399,329 | 8/1983 | Wharton . |
| 4,422,105 | 12/1983 | Rodesch et al. . |
| 4,439,784 | 3/1984 | Furukawa et al. . |
| 4,445,137 | 4/1984 | Panofsky . |
| 4,445,187 | 4/1984 | Best . |
| 4,507,680 | 3/1985 | Freeman . |
| 4,516,156 | 5/1985 | Fabris et al. . |
| 4,530,008 | 7/1985 | McVoy . |
| 4,536,791 | 8/1985 | Campbell et al. . |
| 4,546,382 | 10/1985 | McKenna et al. . |
| 4,555,730 | 11/1985 | Briggs . |
| 4,569,026 | 2/1986 | Best . |
| 4,571,640 | 2/1986 | Baer . |
| 4,573,072 | 2/1986 | Freeman . |
| 4,574,305 | 3/1986 | Campbell et al. . |
| 4,591,248 | 5/1986 | Freeman . |
| 4,599,611 | 7/1986 | Bowker et al. . |
| 4,602,279 | 7/1986 | Freeman . |
| 4,616,261 | 10/1986 | Crawford et al. . |
| 4,635,132 | 1/1987 | Nakamura . |
| 4,644,515 | 2/1987 | Allebest et al. . |
| 4,647,980 | 3/1987 | Steventon et al. . |
| 4,665,431 | 5/1987 | Cooper . |
| 4,694,490 | 9/1987 | Harvey et al. . |
| 4,701,896 | 10/1987 | Allebest et al. . |
| 4,704,725 | 11/1987 | Harvey et al. . |
| 4,733,301 | 3/1988 | Wright, Jr. . |
| 4,734,764 | 3/1988 | Pocock et al. . |
| 4,750,036 | 6/1988 | Martinez . |
| 4,763,317 | 8/1988 | Lehman et al. . |
| 4,768,087 | 8/1988 | Taub et al. . |
| 4,777,529 | 10/1988 | Schultz . |
| 4,780,757 | 10/1988 | Bryer et al. . |
| 4,780,758 | 10/1988 | Lin et al. . |
| 4,785,349 | 11/1988 | Keith et al. . |
| 4,786,967 | 11/1988 | Smith, III et al. . |
| 4,807,031 | 2/1989 | Broughton et al. . |
| 4,816,905 | 3/1989 | Tweedy et al. . |
| 4,821,101 | 4/1989 | Short . |
| 4,839,743 | 6/1989 | Best et al. . |
| 4,846,693 | 7/1989 | Baer . |
| 4,847,690 | 7/1989 | Perkins . |
| 4,847,698 | 7/1989 | Freeman . |
| 4,847,699 | 7/1989 | Freeman . |
| 4,847,700 | 7/1989 | Freeman . |
| 4,855,827 | 8/1989 | Best . |
| 4,862,268 | 8/1989 | Campbell et al. . |
| 4,870,591 | 9/1989 | Cicciarelli et al. . |
| 4,875,096 | 10/1989 | Baer et al. . |
| 4,876,592 | 10/1989 | Von Kohorn . |
| 4,884,974 | 12/1989 | DeSmet . |
| 4,894,789 | 1/1990 | Yee . |
| 4,905,094 | 2/1990 | Pocock et al. . |
| 4,916,633 | 4/1990 | Tychonievich et al. . |
| 4,918,516 | 4/1990 | Freeman . |
| 4,918,620 | 4/1990 | Ulug . |
| 4,924,303 | 5/1990 | Brandon et al. . |
| 4,926,255 | 5/1990 | Von Kohorn . |
| 4,930,019 | 5/1990 | Chu . |
| 4,941,040 | 7/1990 | Pocock et al. . |
| 4,949,170 | 8/1990 | Yanagidaira et al. . |
| 4,965,825 | 10/1990 | Harvey et al. . |
| 4,967,368 | 10/1990 | Bolling et al. . |
| 4,972,328 | 11/1990 | Wu et al. . |
| 4,975,771 | 12/1990 | Kassatly . |
| 4,987,486 | 1/1991 | Johnson et al. . |
| 4,988,111 | 1/1991 | Gerlitz et al. . |
| 4,989,233 | 1/1991 | Schakowsky et al. . |
| 4,989,234 | 1/1991 | Schakowsky et al. . |
| 4,991,011 | 2/1991 | Johnson et al. . |
| 4,994,908 | 2/1991 | Kuban et al. . |
| 5,001,554 | 3/1991 | Johnson et al. . |
| 5,010,400 | 4/1991 | Oto . |
| 5,010,500 | 4/1991 | Makkuni et al. . |
| 5,014,125 | 5/1991 | Pocock et al. . |
| 5,023,707 | 6/1991 | Briggs . |
| 5,033,969 | 7/1991 | Kamimura . |
| 5,034,807 | 7/1991 | Von Kohorn . |
| 5,043,891 | 8/1991 | Goldstein et al. . |
| 5,051,822 | 9/1991 | Rhoades . |
| 5,053,883 | 10/1991 | Johnson . |
| 5,055,924 | 10/1991 | Skutta . |
| 5,057,915 | 10/1991 | Von Kohorn . |
| 5,077,607 | 12/1991 | Johnson et al. . |
| 5,090,708 | 2/1992 | Gerlitz et al. . |
| 5,093,718 | 3/1992 | Hoarty et al. . |

| | | |
|---|---|---|
| 5,109,414 | 4/1992 | Harvey et al. . |
| 5,109,482 | 4/1992 | Bohrman . |
| 5,132,992 | 7/1992 | Yurt . |
| 5,133,079 | 7/1992 | Ballantyne . |
| 5,157,491 | 10/1992 | Kassatly . |
| 5,174,759 | 12/1992 | Preston et al. . |
| 5,176,520 | 1/1993 | Hamilton . |
| 5,177,604 | 1/1993 | Martinez . |
| 5,181,107 | 1/1993 | Rhoades . |
| 5,210,611 | 5/1993 | Yee et al. . |
| 5,220,420 | 6/1993 | Hoarty et al. . |
| 5,227,874 | 7/1993 | Von Kohorn . |
| 5,236,199 | 8/1993 | Thompson, Jr. . |
| 5,239,463 | 8/1993 | Blair et al. . |
| 5,239,617 | 8/1993 | Gardner et al. . |
| 5,247,347 | 9/1993 | Litteral et al. . |
| 5,261,820 | 11/1993 | Slye et al. . |
| 5,318,450 | 6/1994 | Carver . |
| 5,340,317 | 8/1994 | Freeman . |
| 5,388,197 | 2/1995 | Rayner . |
| 5,404,393 | 4/1995 | Remillard . |
| 5,405,152 | 4/1995 | Katanics et al. . |
| 5,442,389 | 8/1995 | Blahut et al. . |
| 5,454,722 | 10/1995 | Holland et al. . |
| 5,455,910 | 10/1995 | Johnson et al. . |
| 5,467,288 | 11/1995 | Fasciano et al. . |
| 5,488,411 | 1/1996 | Lewis et al. . |
| 5,526,478 | 6/1996 | Russell, Jr. et al. . |
| 5,532,748 * | 7/1996 | Nainpally ............................. 348/432 |
| 5,537,141 | 7/1996 | Harper et al. . |
| 5,541,662 | 7/1996 | Adams et al. . |
| 5,557,724 | 9/1996 | Sampat et al. . |
| 5,585,858 | 12/1996 | Harper et al. . |
| 5,594,492 | 1/1997 | O'Callaghan et al. . |
| 5,594,935 | 1/1997 | Reber et al. . |
| 5,600,363 * | 2/1997 | Matthews, III ...................... 348/143 |

OTHER PUBLICATIONS

Bock, Videodisk Standards: A Software View of the Technology, 8012 SMPTE Journal, vol. 92, No. 5, May 1983, pp. 571–576.

Campbell, Optimal Decision Making in a Business Simulation, System Sciences, 1989 Annual Hawaii International Conference, vol. III, pp. 822–831.

Dawson, Compression on the Fast Track, Cablevision, Apr. 22, 1991, pp. 22–30.

Martial et al., An Interactive Planner for Open Systems, Proceedings of the 4th Conference on Artificial Intellingence, Mar. 1988, pp. 293–298.

Gault, Turning Cold Box Into Interactive TV, Crain's New York Business, Jul. 15, 1991, p. 17.

Tsuruta et al., A Knowledge Based Interactive Train Scheduling System Aiming at Large Scale Complex Planning Expert Systems, International Workshop on Artificial Intelligence for Industrial Applications, 1988, pp. 490–495.

Gilder, Now or Never, Forbes, Oct. 14, 1991, pp. 188–198.

Kim, First All–Digital HDTV Developed by Video Cipher, Multichannel News, Jun. 11, 1990, p. 35.

Kim, ATC: Technical Tidal Wave to Engulf Cable Industry, Multichannel News, Aug. 13, 1990, pp. 33–34.

Kim, Jerrold Offers Cable Digital Compression, Multichannel News, Mar. 11, 1991, p. 6.

Kim, Test Equipment for Digital Still a Puzzle, Multichannel News, May 27, 1991, p. 24.

Powell, Digitizing TV Into Obsolescense, New York Times, Oct. 20, 1991.

Waterset al., Talking Back to the Tube, Newsweek, Dec. 3, 1990, pp. 56–57.

Will it Revolutionize HDTV?, Broadcasting, Jun. 4, 1990, pp. 33–34.

Video Storage In Digital Transmission, Space Technology, Cable Television Laboratories, vol. 3, No. 7, Sep. 1991, pp. 1–6.

Fig_1

Fig._3

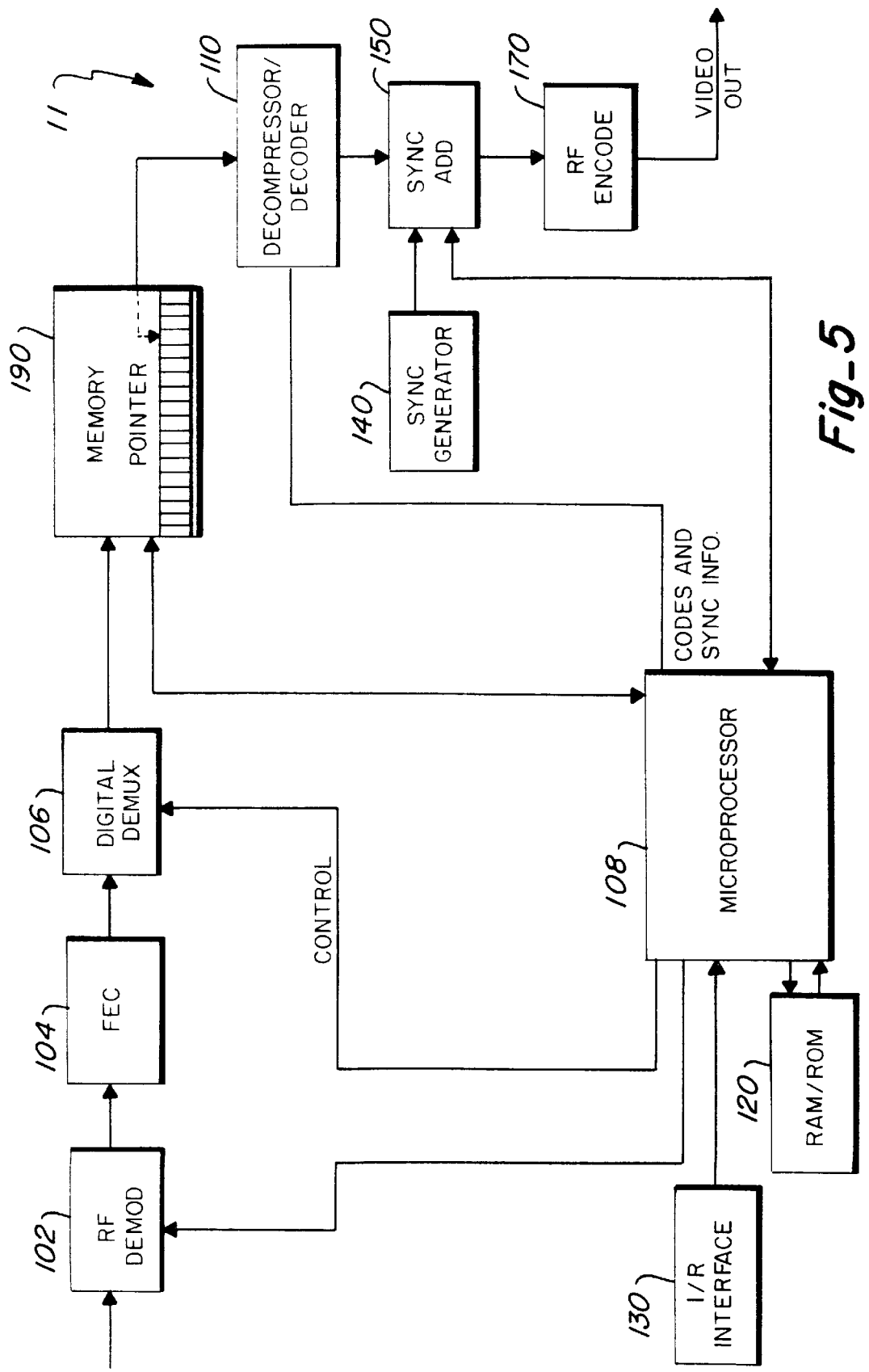

| T0 | $a_{12}$ | $a_{11}$ | $a_{10}$ | $A_9$ | $a_8$ | $a_7$ | $a_6$ | $A_5$ | $a_4$ | $a_3$ | $a_2$ | $A_1$ ↑ |
|---|---|---|---|---|---|---|---|---|---|---|---|---|
| T1 | $c_1$ | $a_{12}$ | $a_{11}$ | $a_{10}$ | $A_9$ | $a_8$ | $a_7$ | $a_6$ | $A_5$ | $a_4$ | $a_3$ | $a_2$ ↑ |
| T2 | $c_2$ | $c_1$ | $a_{12}$ | $a_{11}$ | $a_{10}$ | $A_9$ | $a_8$ | $a_7$ | $a_6$ | $A_5$ | $a_4$ | $a_3$ ↑ |
| T3 | $C_3$ | $c_2$ | $c_1$ | $a_{12}$ | $a_{11}$ | $a_{10}$ | $A_9$ | $a_8$ | $a_7$ | $a_6$ | $A_5$ | $a_4$ ↑ |
| T4 | $c_4$ | $C_3$ | $c_2$ | $c_1$ | $a_{12}$ | $a_{11}$ | $a_{10}$ | $A_9$ | $a_8$ | $a_7$ | $a_6$ | $A_5$ ↑ |
| T5 | $c_5$ | $c_4$ | $C_3$ | $c_2$ | $c_1$ | $a_{12}$ | $a_{11}$ | $a_{10}$ | $A_9$ | $a_8$ | $a_7$ | $a_6$ ↑ |
| T6 | $c_6$ | $c_5$ | $c_4$ | $C_3$ | $c_2$ | $c_1$ | $a_{12}$ | $a_{11}$ | $a_{10}$ | $A_9$ | $a_8$ | $a_7$ ↑ |
| T7 | $C_7$ | $c_6$ | $c_5$ | $c_4$ | $C_3$ | $c_2$ | $c_1$ | $a_{12}$ | $a_{11}$ | $a_{10}$ | $A_9$ | $a_8$ ↑ |

(ENOUGH C'S TO DECOMPRESS)

| T8 | $c_8$ | $C_7$ | $c_6$ | $c_5$ | $c_4$ | $C_3$ ↑ | $c_2$ | $c_1$ | $a_{12}$ | $a_{11}$ | $a_{10}$ | $A_9$ |
|---|---|---|---|---|---|---|---|---|---|---|---|---|
| T9 | $c_9$ | $c_8$ | $C_7$ | $c_6$ | $c_5$ | $c_4$ ↑ | $C_3$ | $c_2$ | $c_1$ | $a_{12}$ | $a_{11}$ | $a_{10}$ |

(REFILL BUFFER AND RESET POINTER)

| Tn | $c_{14}$ | $c_{13}$ | $C_{12}$ | $c_{11}$ | $c_{10}$ | $c_9$ | $C_8$ | $c_{10}$ | $c_9$ | $c_8$ | $C_7$ | $c_6$ ↑ |
|---|---|---|---|---|---|---|---|---|---|---|---|---|

Fig_6

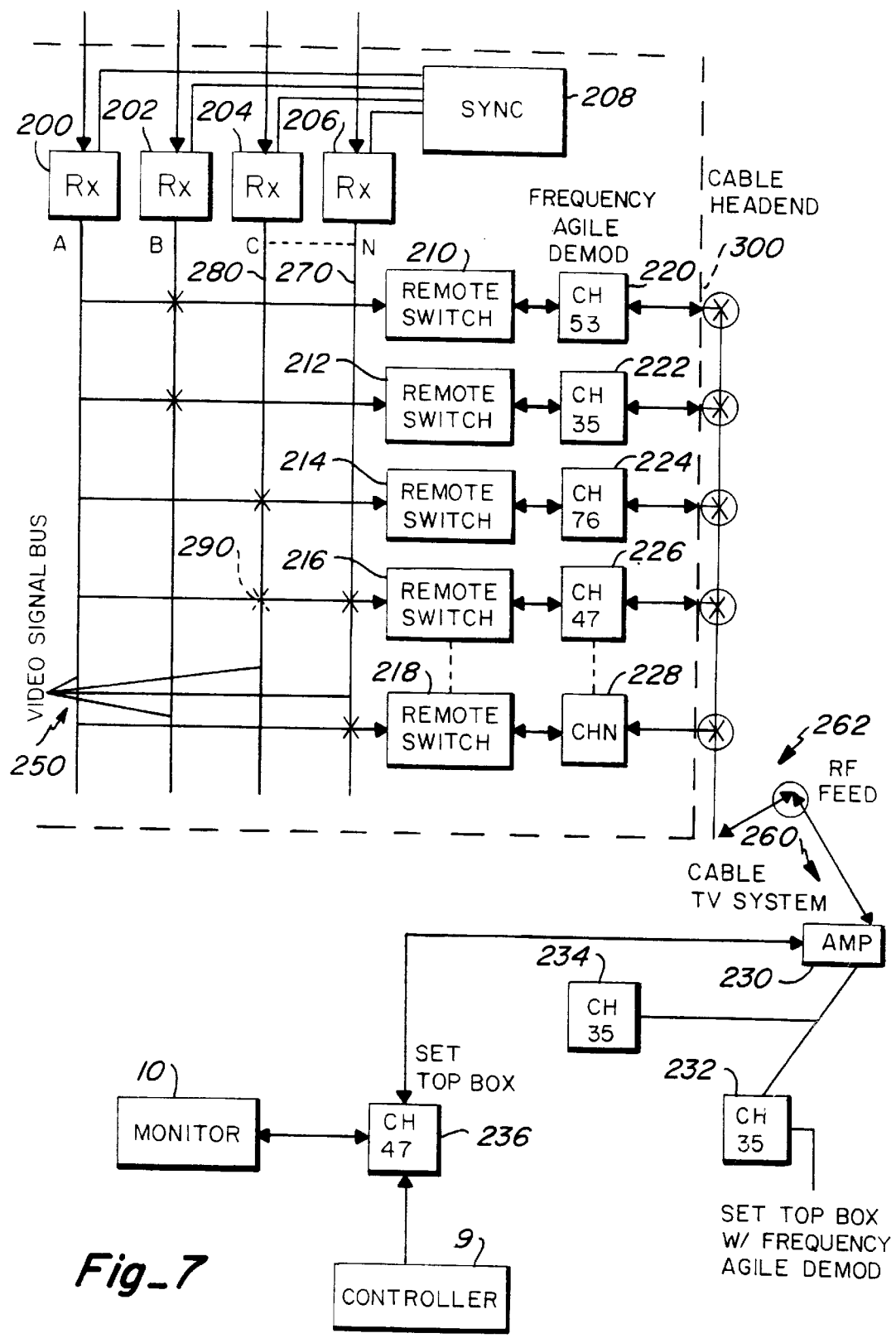
Fig_7

COMPRESSED DIGITAL-DATA INTERACTIVE PROGRAM SYSTEM

This application is a continuation of application Ser. No. 08/443,607 filed May 18, 1995, now U.S. Pat. No. 5,724,091, which is a continuation-in-part of application Ser. No. 08/166,608 filed Dec. 13, 1993, abandoned, which is a continuation of 07/797,298 filed Nov. 25, 1991, abandoned.

BACKGROUND OF THE INVENTION

1. Field of the Invention

The present invention relates generally to interactive response systems, and more particularly to an interactive television system which provides interactive programming using compressed, digital data having more than one video signal on a broadcast channel, or a multiplexed signal within a digital format, or both.

The invention also relates to seamlessly switching between video signals while viewing a first video signal, even though the video signal switched to may be on a different broadcast channel, or on the same channel multiplexed with, the currently viewed video signal.

2. Description of the Prior Art

Interactive systems are well known in the art. By synchronizing parallel tracks of an information storage media, and relating the content of the various tracks, it was found that interactive activity could be simulated. For example, commonly owned Freeman, U.S. Pat. No. 4,602,279 discloses the use of a time synchronized multi-track audio tape to store educational conversations. One track is employed to relay educational interrogatories to a user, and the remainder of the tracks, selectable by a switching mechanism, are used to convey responsive messages.

These systems progressed to interactive television, wherein multiple broadcast or cable channels were switched in response to user selections to provide interactive operation. Commonly owned Freeman, U.S. Pat. No. 4,847,700 discloses an interactive television system wherein a common video signal is synched to a plurality of audio channels to provide content related to user selectable responses.

Commonly owned Freeman, U.S. Pat. No. 4,264,925 discloses the use of a conventional cable television system to develop an interactive system. Standard television channels with time synchronized content are broadcast to a plurality of users. Each user switches between channels responsive to interrogatories to provide interactivity.

These systems have been tailored to include memory functions so that the system can be more interactive, individually responsive, and so that customized messages may be given to the various categories of users responsive to informational queries. Freeman, U.S. Pat. No. 4,602,279 discloses the use of a memory to store demographic profiles of television viewers. This information is stored to be recalled later for providing target specific advertising, for example. Prior art interactive television systems were generally concerned with providing one signal (i.e. one video signal) per channel, whether the channel is on cable television, broadcast television, or a VCR. Because cable and broadcast television channel capacity is becoming limited as more and more cable channels are being utilized for conventional programming, and interactive systems of the type described require multiple channels, it is desirable to reduce the channel capacity required for such systems while still providing at least the same level of interactivity. Disadvantages of the prior art are overcome by the present invention which provides an interactive television system which employs multiple, time-synchronized, content-related video signals on one or more broadcast channels.

SUMMARY OF THE INVENTION

The present invention is an interactive cable television system which utilizes digital video signals to provide customized viewing responsive to user selections. A standard cable or direct broadcast satellite television distribution network is utilized for transmitting the interactive and other programming to users. The present invention allows a plurality of viewers to be simultaneously provided with a plurality of different program information message signals related in time and content to each other. The interactive program comprises a plurality of video signals related in time and content to one another.

The video signals are converted into digital format for transmission. In a digital format, it is possible to transmit more than one video signal per cable television channel. Further, it is possible to transmit video signals via conventional telephone lines. If desired, the various digital video signals may be compressed before transmission. Compression allows an even larger number of video signals to be transmitted over a channel of the transmission media. A multiplexer combines the various digital signals into a reduced number of transmission data streams for transmission. The various NTSC television channels may be allocated in a predetermined fashion to maximize the number of simultaneously transmittable signals. The multiplexer in conjunction with the television transmission system multiplexes the desired data streams onto the desired channels, and transmits these signals over the NTSC channels. The number of video signals which may be multiplexed onto a data stream on a single transmission channel will vary depending on the video signals to be transmitted. The television channels containing a data stream of multiplexed video signals may be transmitted over a standard cable television distribution network, or direct broadcast satellite transmission system. A receiver receives one or more television channels, some or all containing a multiplexed data stream of video signals or non-multiplexed digital video signals, and in conjunction with a signal selector, selects a particular data channel/data stream for playback, then selects a particular video signal from the data stream's multiplexed signal, and finally expands the video signal, if necessary, for playback to a television monitor.

A multiple choice controller operates to control the receiver and signal selector to select a particular video signal for playback. If more than one channel is received, the multiple choice controller may be programmed to map the different channels, and the multiple signals thereon, to a serial numerical channel representation to simplify use by the user. The signal selector includes the necessary expansion apparatus corresponding with the compression scheme in use.

In practice, a user selects a desired interactive program to be viewed. Using the multiple choice controller, the user selectably responds to information displays or interrogatory messages and the signal selector selects a particular multiplexed video signal and de-multiplexes, expands and displays the selected video signal. Alternatively, the signal selector may select a video signal based on personal profile information stored in memory.

If more signals are needed for an interactive program than were mappable to a data stream on a single channel, the signal selector in conjunction with the receiver is programmed to switch between the various video signals within a multiplexed data stream as well as between data streams among the various broadcast channels to provide the necessary level of interactivity.

The various information segments in the various video signals preferably relate in real-time and content so that an interactive conversation can occur as the video signal is played back and the user responds to the various interrogatories on the video signals. The use of multiple signals per channel may be used for many types of interactive programs, including those disclosed in the previously mentioned U.S. patents, for example, field synchronized multiple camera angles from a sporting event, or an interactive game show. However, the present invention also covers the use of various video signals not related in real-time and content.

In a two-way embodiment, the various signals which comprise the interactive program may be switched at the head end rather than at the receiver. This embodiment may be used in a cable television system, a direct broadcast satellite system, a conventional telephone system modified to receive digital video signals, or any other appropriate transmission system capable of sending digital video signals. The multiple choice control unit, rather than the hand-held multiple choice controller, selects a desired video signal by relaying the multiple choice selections of the user through a relay box back to a remotely located switching station, preferably the cable television source. The multiple choice selections may be relayed to the switching station in any conventional means, such as two-way cable television, telephone, or FM transmission. If the interactive programming is being transmitted over a telephone line, the multiple choice selections may be relayed back over the same telephone line. The switching station receives the multiple choice selection of the user and routes the correct signal down the appropriate cable channel, telephone line, or other transmission media for the particular user. In such an arrangement, only a single link is required between the subscriber or receiver and the head end so that the one channel link can be used to receive a plurality of different channel selections dependent on the interactive choice relayed from the receiver to the video switch at the head end.

If desired, the two-way link may be used for other purposes, such as to transmit user demographic data back to the programming source for commercial reasons, or to allow an interactive game show player to win prizes, for example.

The system of the present invention allows improved performance during switching, making the channel switches transparent. When a channel change is required by a user response to an interactive interlude, a slight imperceptible delay is programmed to allow the expansion algorithm an opportunity to adjust to the rapid change from one video signal to another.

During the delay, previously obtained video information is displayed while the interactive system locates, receives, demultiplexes, decompresses, decodes, and processes the new video signal. This allows the interactive system to switch to the new video signal without flicker or distortion appearing on the TV screen, i.e., a seamless switch.

Disclosed are different methods to achieve this seamless switching. One involves an analog video frame buffer. Another uses two tuners. Other alternatives include: (a) using two digital video buffers; (b) using a large memory; (c) using a large buffer in an embodiment similar to that of (b); and (d) switching at the cable headend.

BRIEF DESCRIPTION OF THE DRAWINGS

FIG. 5 is a block diagram showing another alternative to achieve seamless switching between video signals.

FIG. 6 is an alternative method of achieving seamless switching by using the memory shown in FIG. 5 as a buffer.

FIG. 7 is an alternative embodiment of achieving seamless switching by switching channels at the cable headend.

DESCRIPTION OF THE PREFERRED EMBODIMENT

Figure 1:
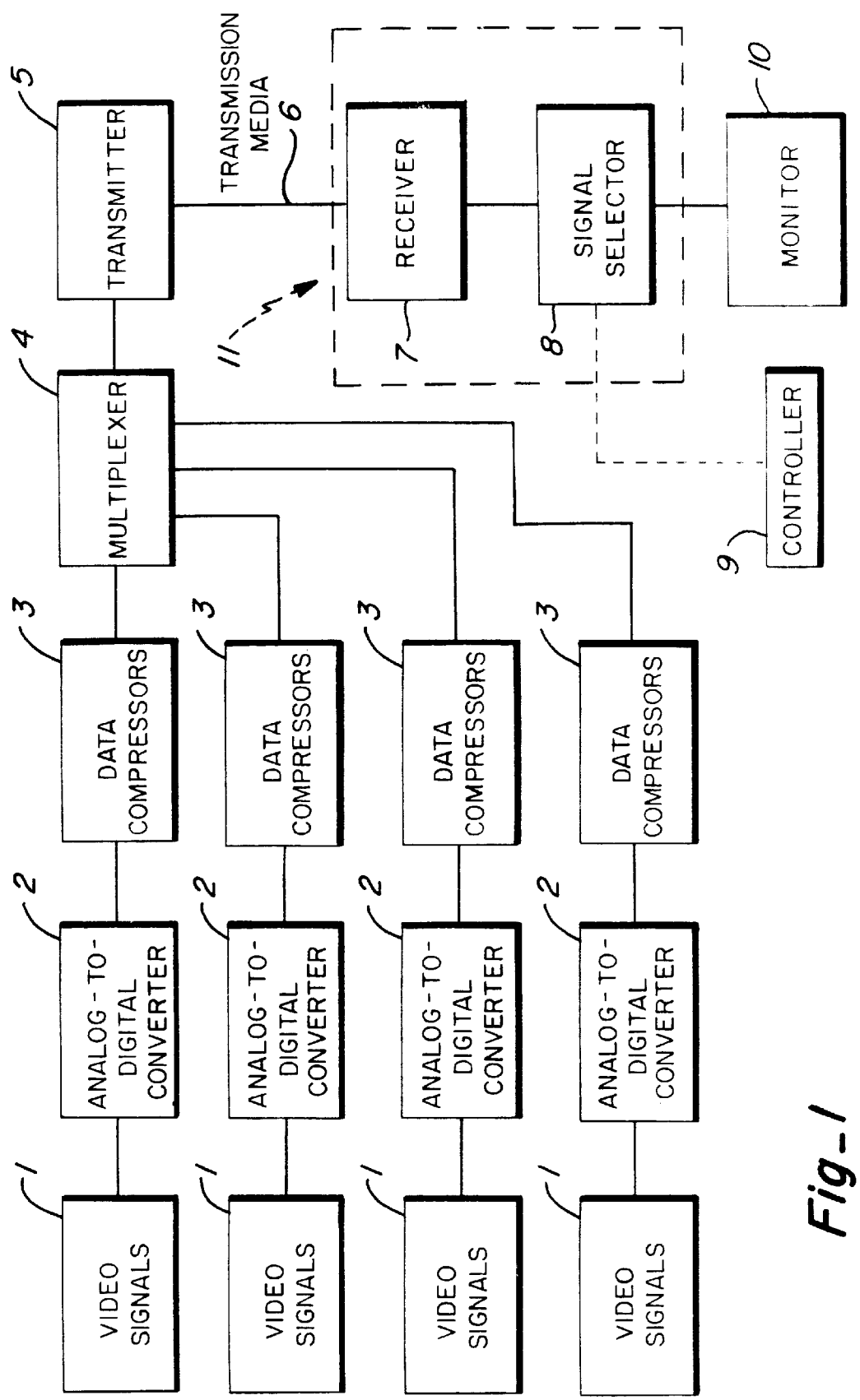
FIG. 1 is a block diagram of the Interactive Television System of the present invention.

The present invention is an interactive television system in which a plurality of viewers are simultaneously provided with a plurality of different program information message signals. A plurality of video signals 1 are provided. Video signals 1 may be, for example, various field and/or audio synchronized camera angles of a sporting event, or a game show having a content and host acting responsively to user selections. Alternatively, video signals 1 may be any video signals suitable for interactive conversation, such as those described in U.S. Pat. Nos. 4,847,700, 3,947,972, 4,602,279, 4,264,925, or 4,264,924, the contents of which are incorporated specifically herein by reference. Various types of time and content related video signals exist which are suitable for interactive operation.

In previous systems, these various signals would be transmitted to a receiver on separate broadcast or cable channels, each requiring a separate 6 Mhz NTSC channel. According to the present invention, video signals 1 are directed to analog-to-digital ("A/D") convertors 2 which convert the various video signals into digital format for transmission. A/D convertors 2 may be of any conventional type for converting analog signals to digital format. An A/D convertor may not be needed for each video signal 1, but rather fewer convertors, or even a single convertor are capable of digitizing various video signals 1. Interactive video programs may also be delivered to a cable or other distribution network in pre-digitized and/or precompressed format.

Digital conversion results in very large amounts of data. It may therefore be desirable to reduce the amount of data to be sent, allowing more signals to be sent over a single transmission channel. For example, a single frame of digitized NTSC video represents over 350 Kbytes of data. Therefore, two hours of standard video is about 80 Gbytes. Since there are 30 frames/sec in such video, the data transfer rate is 22 Mbytes/sec. This large amount of data is preferably reduced by digital compression.

In order to reduce the data transfer requirements, the various digital video signals are preferably compressed before transmission. The video may be compressed by any conventional compression algorithm, the two most common types being "processor intensive" and "memory intensive."

The processor intensive approach performs compression by eliminating non-changing aspects of a picture from the processing in the frame-to-frame transfer of information, and through other manipulations of picture information involving mathematical computations that determine the degree to which a given motion in a picture is perceptible to the human eye. This approach depends on high-speed processing power at the transmission point.

The memory approach involves division of a picture frame into hundreds of minuscule blocks of pixels, where each block is given a code representing its set of colors and variations in luminance. The code, which is a much smaller increment of information than all the information that would describe a given block of the picture, is transmitted to the receiver. There, it calls up the identically coded block from a library of blocks stored in the memory of the receiver.

Thus, the bit stream represents a much smaller portion of the picture information in this approach. This system is generally limited by the variety of picture blocks which may be stored in the receiver, which relates directly to memory size and microprocessor power.

Examples of commonly known compression techniques which may be used with the invention are JPEG, MPEG1 and MPEG2.

Data Compressors 3 are provided to reduce the data for each video signal which must be transmitted. Data compressors 3 may be of any conventional type commonly known in the art for compressing video images, such as those previously described. Compression of the various video signals might be done with fewer data compressors 3 than one compressor per video signal. In a conventional analog NTSC system, by way of example, it is customary to transmit one video signal per 6 MHZ channel. By digitizing the video signal, it is possible to send a data stream containing more than one video signal in one channel. Compressing the digitized signals, allows even more video signals to be transmitted over a single transmission channel. The number of signals which may be sent over a single channel is generally related to, for example, a) the type of video being sent; b) the video compression scheme in use; c) the processor used and memory power; and d) the bandwidth of the transmission channel.

Compression techniques exploit the fact that in moving images there is very little change from frame-to-frame. Editing out the redundancies between frames and coding just the changes allows much higher compression rates. The type of video which normally contains a great deal of high-speed movement, such as occurs at live sporting events, will, therefore, have the lowest compression rates. Movies, on the other hand, which normally have a lower frame rate and less frame-to-frame change than a live sporting event will achieve higher compression rates. Currently, commonly known compression schemes have compression rates that vary from 2:1 to 10:1 for satellites, and 2:1 to 5:1 for cable television systems, depending on the degree of motion.

Once the various video signals 1 have been digitized and compressed, multiplexer 4 combines the various digital signals into a reduced number of transmission data streams for transmission. For example, if 68 NTSC channels are available, and each channel is capable of transmitting either 4 digitized, compressed slow moving video signals (e.g. movies) or 2 digitized, compressed, high-speed video signals (e.g. sports), then the various NTSC channels should be allocated in a predetermined fashion to maximize the number of simultaneously transmittable signals.

As an example, the broadcast frequency corresponding to a first NTSC channel may contain a data stream of separate digitally compressed non-interactive movies. On this frequency, the data stream would contain video signals representing a number of movies. However, the video signals, unlike those of an interactive program, are not related in time and content. The frequency corresponding to a second channel might contain a digital data stream of an interactive sports program, consisting of two multiplexed compressed high-speed video signals that are preferably related in time and content. The frequency corresponding to a third channel might contain a digital data stream of an interactive movie consisting of four multiplexed compressed video signals which are related in time and content. The frequency corresponding to a fourth channel might contain an analog NTSC signal relating to local programming. Therefore, using the invention, four NTSC channels could contain a channel of multiplexed movies, an interactive sports program, an interactive movie, and local programming.

Multiplexer 4 receives the incoming compressed, digitized video signals and in a predetermined conventional fashion, in conjunction with transmitter 5, multiplexes the desired video signal onto the desired channels, and transmits these signals over the NTSC channels. Certain NTSC channels may contain only one video or other signal, in analog or digital form.

As indicated earlier, the number of video signals which may be multiplexed onto a data stream on a single transmission channel will vary. Also, the number of channels which use data streams may vary. The transmission data streams are transmitted by transmitter 4 via transmission media 6 to a receiving station 7. The transmitter 4, media 6, and receiver 7 may be any conventional means for transmitting digital video signals including broadcast television, cable television, direct broadcast satellite, fiber optic, or any other transmission means. Alternatively, the invention may be self-contained in a stand-alone system, as explained below.

The transmission means may also be a telephone system transmitting a digital video data stream. Thus, a multiplexed data stream containing several broadcast channels or an interactive program with related video signals may be sent directly to a user over a single telephone line. The aforementioned digital transmission devices may include means for transmitting analog signals as well.

In one of the preferred embodiments, the digital transmission signal is transmitted using a cable television system. Receiver 7 receives various NTSC channels, some or all containing multiplexed or non-multiplexed digital video signals. Ordinarily, more than one channel will be transmitted by transmitter 5 and received by receiver 7 as in an ordinary cable television system. However, each of the different channels may have a data stream containing several digitized video signals thereon. Therefore, receiver 7 preferably operates in conjunction with signal selector 8 to select a particular NTSC channel for playback, then to select a particular video signal from the data stream's multiplexed signal, and finally to uncompress or expand the compressed video signal, if necessary for playback to monitor 10.

Multiple choice controller 9 operates to control receiver 7 and signal selector 8 to select a particular video signal for playback. In practice, a user need not know that multiple signals per channel are in use. If, for example, 68 channels with 4 signals-per-channel were in use, controller 9, in conjunction with receiver 7 and signal selector 8 might be programmed to represent these channels to the user as channels 12–72. Monitor 10 may be, for example, a conventional television. Signal selector 8 preferably includes a conventional de-multiplexer for selecting a particular video signal from the data stream on the channel currently being received by receiver 7. Signal selector 8 further includes the necessary un-compression or expansion apparatus corresponding with the compression scheme in use by compressors 3.

In practice, an interactive sporting event program might be transmitted on a 6 MHZ cable television signal using a compression-multiplexing scheme which allows two sports video signals (A and B, for example) to be transmitted over a single NTSC channel (channel 34, for example). It might be desired to have four video signals (A–D, for example) for the particular interactive sporting event. A first video signal (signal A) may contain the standard broadcast signal of the game; the second video signal (signal B) may contain a close-up view of the game action; a third video signal (signal C) may contain a continuously updated replay of game highlights; the fourth video signal (signal D) may contain statistical information. These four video signals (A–D) may, for example, be multiplexed as follows: video signals A and B multiplexed onto a data stream transmitted on cable channel 34; video signals C and D multiplexed onto data stream transmitted on cable channel 35. Alternatively, all four video signals (A–D) could be multiplexed into one data stream carried on one frequency channel. These four signals may, however, be mapped by controller 9, or signal selector 8, to play as separate channel displays for the user which, when the viewer makes choices on the multiple choice controller, a seamless switch occurs therebetween. Each video signal of this interactive program may include a label which reads, for example, "Full-Screen Action—Press A: Close-up Action—Press B: Replay—Press C: Statistics—Press D."

As shown, if more signals were needed for an interactive program than were mappable to a data stream on a single channel, signal selector 8 in conjunction with receiver 7 may be programmed to switch between the various video signals 1 as well as the various broadcast channels to provide the necessary level of interactivity. However, preferably all the various video signals associated with a particular interactive program are multiplexed onto a single channel.

Additionally, the signal selector 8 may store information relating to current and previous user responses. For example, the personal profile of the viewer or previous response patterns of the viewer could be stored in memory. This information may be used in conjunction with commands transmitted within the video signals, as discussed in U.S. Pat. No. 4,602,279, incorporated herein by reference. The stored personal profile information and received commands may be used to switch interactively between data streams and video signals without any additional response from the user.

The multiplexed interactive program may be transmitted over a single telephone line, if desired. In this embodiment, multiple choice controller 9 is programmed to switch between the various video signals on the single telephone line. If additional channels were desired, a two-way configuration is used as described below.

The system of the present invention may be utilized in an educational embodiment. In this embodiment, information is stored on each data stream in a plurality of reproducible information segments, each of which comprises a complete message reproducible by the receiver directly in response to the selection of the video signal by signal selector 8 responsive to a user selection on multiple choice controller 9. Each of the information segments in the various data streams contain interrogatory messages with associated multiple choice responses, responsive messages, informational messages, or combinations thereof.

The various information segments in the various data streams preferably relate in real-time and content so that an interactive conversation may occur as the video signals are displayed and the user responds to the various interrogatories contained in the video signals. As a user answers a particular interrogatory with a multiple choice response, the information in the video signal associated with the particular selection is displayed by the signal selector 7. The various interrogatories, responsive messages, and informational messages may generally be contained in any one, more than one or all of the various video signals.

The use of a data stream containing multiple video signals per broadcast channel may be used for many types of interactive programs, such as those disclosed in the previously mentioned U.S. patents. Other interactive programs may be developed which are within the scope of the present invention.

The present invention may also be utilized as a stand-alone system with no transmission means necessary. In this embodiment, the digitized video signals that make up an interactive program are stored in local storage means such as video tape, video disk, memory (e.g., RAM, ROM, EPROM, etc.) or in a computer. Preferably, the digital video signals are multiplexed onto a standard NTSC signal. The particular storage means may be connected to any of the interactive boxes disclosed in FIGS. 3–5, and described below. The interactive boxes would then be connected to a television set. Alternatively, the circuitry in FIGS. 3–5 below could be implemented on a board and inserted into a standard personal computer (PC). A separate microprocessor on the interactive board is not necessary for this configuration since the standard PC processor performs the functions of the processor 108 shown in FIGS. 3–5.

Figure 2:
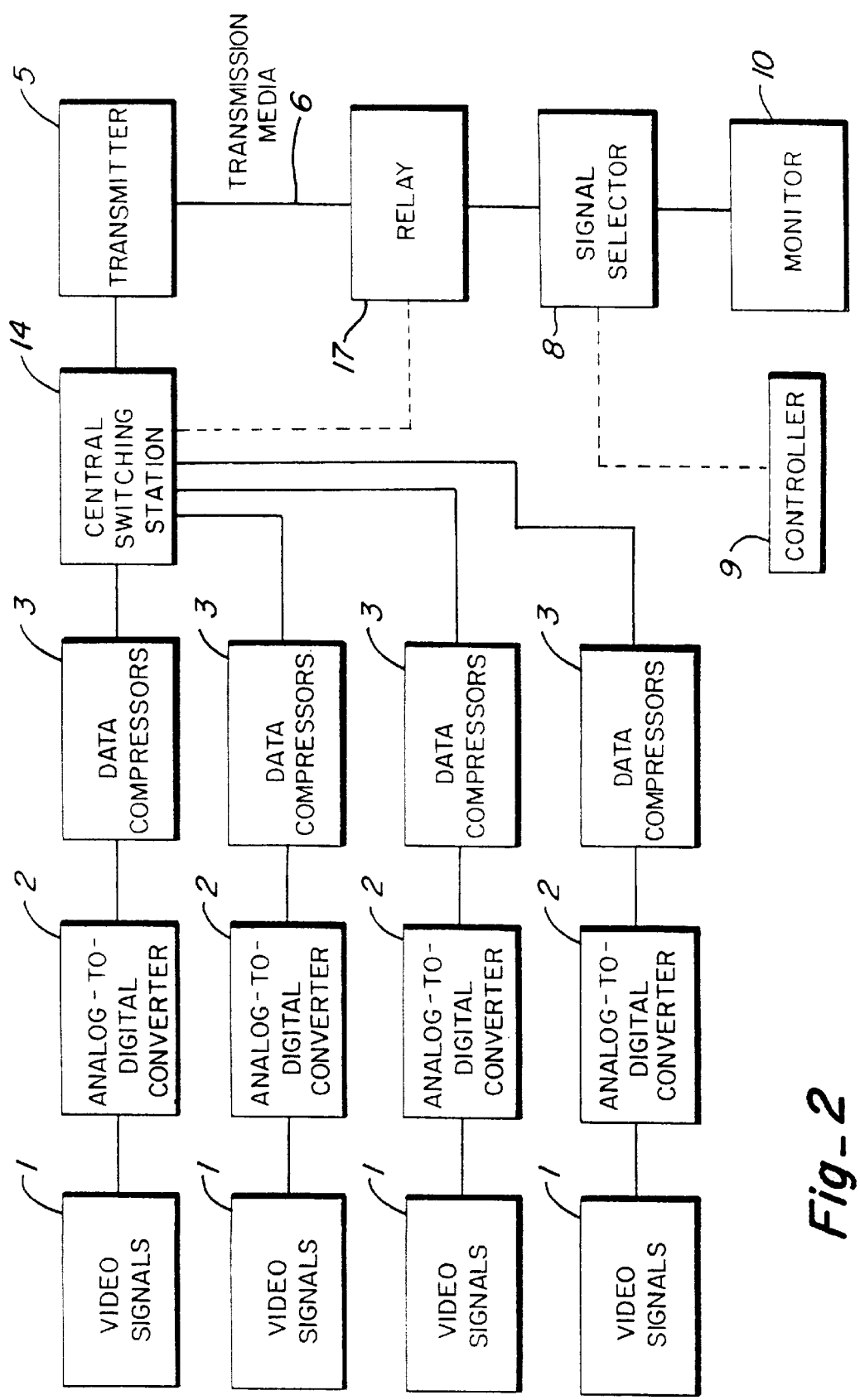
FIG. 2 is a block diagram of the system of the present invention in a two-way transmission configuration.

As shown in FIG. 2, the system of the present invention may be operated in a two-way configuration. In this mode, the various video signals 1 are processed as previously described, being digitized by A/D convertor 2 and compressed by video compressors 3. The signals are then routed to a central switching station 14. In this embodiment, the switching between the various video signals is accomplished at the head end rather than at the receiver. Multiple choice control unit 9 relays the multiple choice selections of the user through a relay box 17 back to the remotely located switching station 14. The multiple choice selections may be relayed by relay box 17 to the switching station by any conventional means, such as two-way cable television, telephone, or FM transmission. Switching station 14 receives the multiple choice selection of the user and routes the desired signal to transmitter 5 which conventionally transmits the desired video signal down the appropriate cable channel for the particular user. If desired, transmitter 5 may also transfer conventional programming on the cable television channels not being used for interactive programming. Alternatively, switching station 4 may include multiplexing equipment as previously described, and thus operate multiple interactive or noninteractive programs over a single television channel.

For example, if it were desired to implement the interactive football game program as previously described, a single NTSC cable channel may be allocated for the program. However, in this instance, the video signals would be present at the transmitting end. In response to a signal from wireless controller 9, a signal is sent by relay box 7 to the cable TV switching station which routes the desired video signal to the requesting viewer. Such a system requires very fast switching equipment, but can be implemented using digital imagery.

Alternatively, it may be desirable to transmit the interactive sporting event over a single telephone line. When the user enters a selection on controller 9, a signal is sent via the telephone line to the central switching station which routes the desired signal of the interactive program over the user's telephone line so that a single link handles both the interactive choice being made at the receiver and the transmission of that choice, out of a plurality of choices, from the head end where the actual switching takes place in response to the interactive selection made at the receiver.

The two-way link between the user and the switching station may be used for other purposes. For example, demographic data may be transferred from the user to the broadcast network for commercial purposes, such as targeted advertising, billing, sending a game show winner a winning number for pickup of a prize, or other commercial or non-commercial purposes.

As previously described, compression systems generally perform less efficiently when frame-to-frame content includes many changes in pixel content (e.g., during fast motion or scenery changes). The system of the present invention may be advantageously programmed to ease the processing burden on the uncompression program. When a key on the controller is depressed to select a desired signal, a slight imperceptible delay may be effectuated if desired. This delay allows the uncompression or expansion algorithm a short period of time to adjust to the rapid change from one video signal to another which ordinarily causes a degradation in the efficiency of the algorithm causing video glitches to appear on the screen display.

As shown in FIG. 7, a two way link (similar to FIG. 2) may also be used, employing virtual channels back to the user. In this embodiment, multiple video signals, preferably related in time and synchronous to each other, are present at a cable headend 300 on multiple channels A, B, C, . . . N of a video signal bus 250. The signals may be locally generated or received from a remote location (such as a sporting arena) by receivers 200, 202, 204, and 206. Alternatively, if the remotely received signals are digitally multiplexed onto one channel, a digital demultiplexer would replace receivers 200–206 and would demultiplex the signals and place each signal on a separate bus channel. The local or remote signals are synchronized by sync circuit 208. A number of remote control interactive switches 210, 212, 214, 216, and 218 are connected to video signal bus 250. The multiple channels on bus 250 are provided synchronously and simultaneously to the series of remote control interactive switches 210, 212, 214, 216, 218. These remote control interactive switches are dynamically allocated to users who request access to an interactive program. Each switch is connected to a frequency agile modulator 220, 222, 224, 226, 228 to assign the switch a virtual channel in order to connect a signal from bus 250 to a specific user at a remote site. Each switch is assigned to a single user so the number of switches present at the headend is the limiting factor to the number of users who can interact simultaneously. If it is assumed that only a portion of the users will interact simultaneously, an algorithm is used to determine the optimum number of remote switches necessary to assure an acceptable percentage of access.

After passing through the frequency agile modulators 220, 222, 224, 226, 228, the signals from video signal bus 250 progress through the cable (or broadcast TV) system 260. The signals may pass through RF feed 262 and amplifier 230. The user's set top box 232, 234, 236, containing a frequency agile demodulator, is tuned to the frequency of the associated frequency agile modulator 220, 222, 224, 226, 228. The decoded signal from the set top box 232, 234, 236 is displayed on television monitor 10.

When a user desires to interact, the user issues a command on the controller 9. The command is received by the set top box 232, 234, 236. A user request is sent back down the cable or other transmission system 260 to one of the remote switches 210, 212, 214, 216, 218. At the appropriate time, based on the user request and the algorithm for interactivity which accompanies the program, the remote switch makes a cut during a vertical blanking interval from one signal on bus 250 to another signal on bus 250. The result of this switch is modulated by one of the frequency agile modulators 220, 222, 224, 226, 228 and sent down the virtual channel to the user, who sees a seamless cut from one image to the other as a result of the interaction. The signal delivered to the user may be full bandwidth or compressed video. Likewise the video signal on the bus 250 delivering the simultaneous signal to the multiple remote switches 210, 212, 214, 216, 218 may be compressed video. This embodiment allows for a relatively low cost remote user box because the most costly switching equipment is located at the headend and each remote switch may be allocated to any user. Therefore, the cost is spread over the larger population of users.

As an example, it is assumed that the signal received by receiver 206 is placed on bus line 270 of the video signal bus 250 and is forwarded to set top box 236 and displayed on monitor 10. At some point the set top box 236 causes a user request to be generated. The user request is based on a current or past entry on controller 9 and/or information stored in set top box 236 (e.g., information stored could be previous user response information or personal profile information). The cable TV system 260 may amplify the user request at amplifier 230 while carrying the user request back to frequency agile modulator 226, which communicates the request to remote switch 216. During the vertical blanking interval, the remote switch 216 disconnects from old bus line 270 and switches to the appropriate line on the video signal bus 250, in this example line 280, based on the user request. This is shown by the dotted-line connection at 290. The signal from the new connection (received by receiver 204) is sent through the frequency agile modulator 226 on channel 47 and the cable TV system 260 to the user's set top box 236. The new signal is seamlessly displayed on television monitor 10, without any switching occurring at set top box 236.

As alternatives to the cable headend 300 and cable TV 260 of FIG. 7, a telephone central office and/or telephone lines may be used. This alternative would allow the set tops 232, 234, 236 to receive interactive programming from a telephone company or cable headend via telephonic communication.

FIGS. 3–6 show preferred embodiments of the receiver 7 and signal selector 8 of the present invention to enable seamless flicker-free transparent switching between the digital video signals on the same channel or different channels. These embodiments may be connected to any transmission media or simply connected to the output of any stand-alone storage means for the digitized multiplexed interactive program. Preferably, the receiver 7 and signal selector 8 are both components of an interactive program box 11, which connects to a television or other display monitor. Alternatively, the required functionality of the RF receiver 7, signal selector 8 and monitor could all be combined in a standard personal computer by the addition of a few components to the personal computer. To provide this capability, only an RF demodulator board, digital demultiplexer, decompressor(s), frame buffer(s), and sync components need to be added to the personal computer. These items, and any other components, may be connected to the PC processor and storage elements as disclosed in FIGS. 3–5. In this embodiment, the user makes selections via the computer keyboard.

Figure 3:
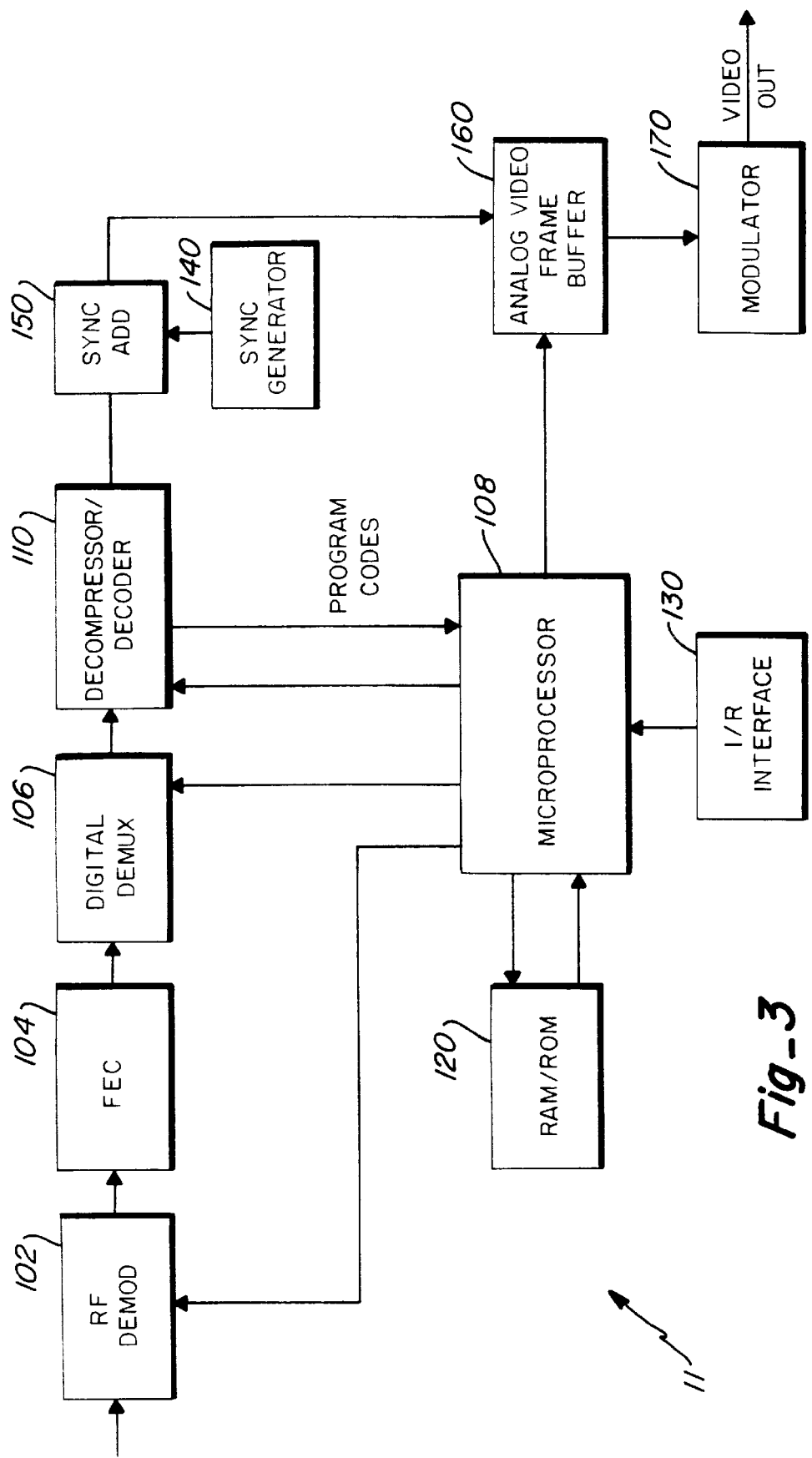
FIG. 3 is a block diagram of one embodiment to achieve seamless switching between video signals.
Figure 4:
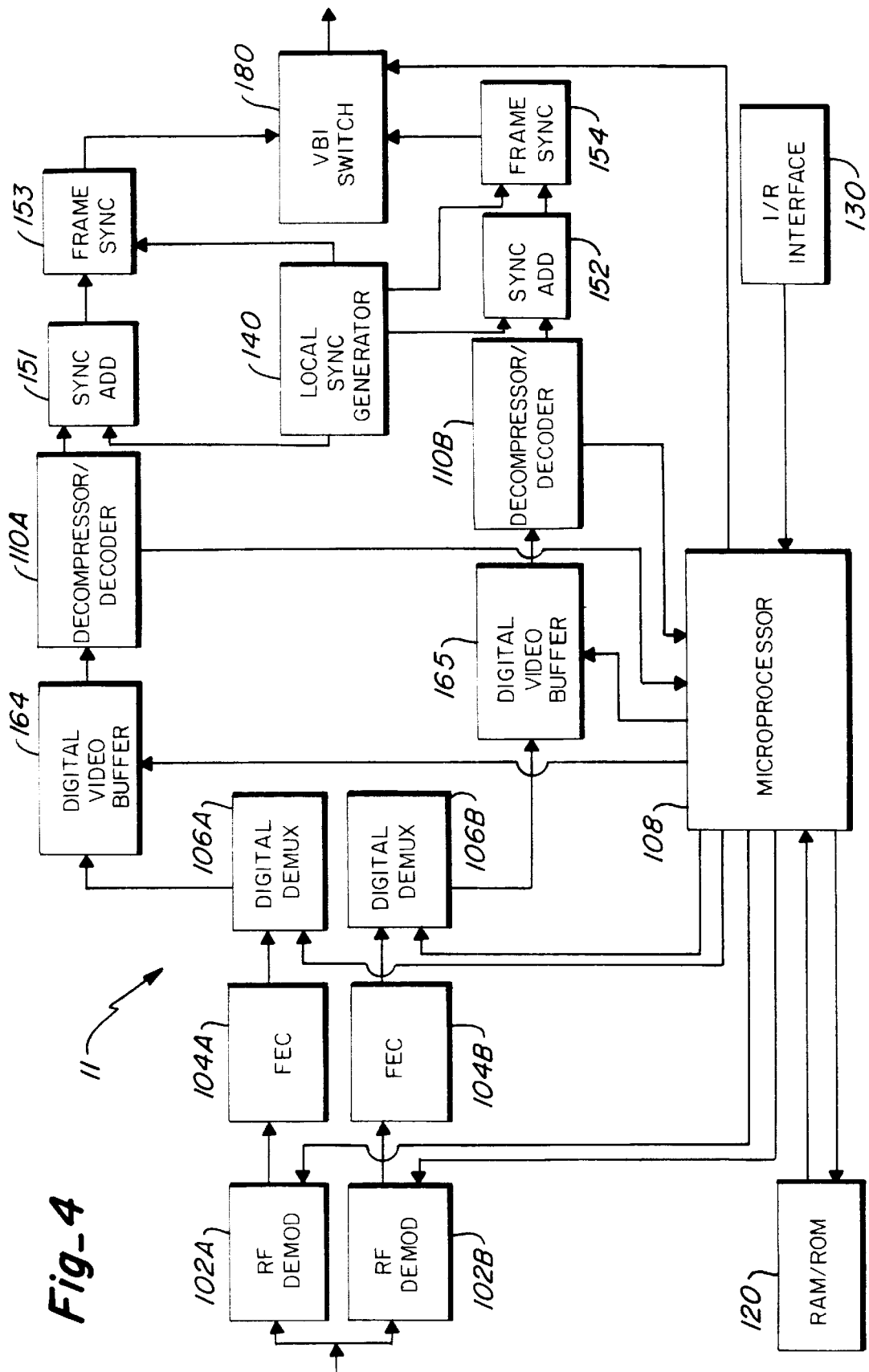
FIG. 4 is a block diagram showing an alternative embodiment to achieve seamless switching between video signals.

FIG. 3 shows an embodiment with a single analog frame buffer. FIG. 4 includes pairs of RF demodulators, error correctors, and demultiplexers and/or a pair of digital video buffers, as described below. FIG. 5 utilizes a single digital multiframe memory. FIG. 6 is directed to an alternative method of using the memory 190 described in FIG. 5, and depicts buffering the memory contents over time. Similar circuit elements appearing in FIGS. 3–5 are referred to by using the same reference numbers.

FIG. 3 shows an embodiment which allows for a seamless video switch between two or more separate digital video signals. As shown in FIG. 3, a microprocessor 108 is connected to RF demodulator 102 and digital demultiplexer 106. The microprocessor 108 directs demodulation and demultiplexing of the proper channel and data stream to obtain the correct video signal. The proper channel is determined either by examination of the user's input from user interface 130 and/or any other information or criteria (such as personal profile information) stored in RAM/ROM 120. For example, the RAM/ROM 120 could store commands provided within the video signals as discussed in U.S. Pat. No. 4,602,279, and incorporated herein by reference. The user interface 130 may be an infrared, wireless, or wired receiver that receives information from multiple choice control unit 9.

The RF demodulator 102 is part of the receiver 7, and demodulates data from the broadcast channel directed by the microprocessor 108. After the data stream is demodulated, it passes through a forward error correction circuit 104 into a digital demultiplexer 106. The demultiplexer is controlled by microprocessor 108 to provide a specific video signal out of a number of video signals which may be located within the data stream on the demodulated broadcast channel. The demultiplexed video signal is then decompressed and decoded by decompressor/decoder 110. The decompressor/decoder 110 includes a digital to analog converter to convert the decompressed signal into an analog signal. The analog video signal is synchronized by a sync add circuit 150 and a sync generator 140. The analog video signal is then buffered by an analog video frame buffer 160. The buffered video signal is modulated by a modulator 170 into a NTSC compatible signal.

By using an analog video frame buffer 160 and delaying the viewing of a given signal, enough time is allowed for the decompressor/decoder 110 to lock onto, decompress, convert to analog, and wait for the resultant vertical interval of a second video signal. For example, assume video signal A is currently being processed and transferred through the circuit shown in FIG. 3 and displayed on the television set or monitor 10. Based upon a user selection, the microprocessor 108 directs the digital demultiplexer 106 and RF demodulator 102 to switch to another video signal, video signal B. To accomplish this, the analog video from the first digital video signal, video signal A, complete with video sync, is fed into analog video frame buffer 160. This buffer can hold the full video picture for "n" number of frames after which the signal is output to the display. In effect, a delayed video signal A is viewed "n" number of frames after the signal has been received by the television receiver. When the user selects a different video path by means of pressing a button on a keypad, the microprocessor instructs the digital demultiplexer 106 to stop decoding signal A and lock onto signal B to begin decoding signal B instead of signal A.

While this is happening, even though the decompressor/decoder 110 is no longer decompressing video signal A, the display is still showing video signal A because it is being read from the buffer 160. As soon as decompressing and decoding occurs, the microprocessor 108 looks for the next vertical blanking interval (VBI) and instructs the analog video frame buffer 160 to switch to its input, rather than its buffered output at the occurrence of the VBI.

Since the RF demodulator 102, forward error corrector 104, digital demultiplexer 106, and decompressor/decoder 110 require a certain time period to decompress and decode the video signal B frame from its data stream, the size of the buffer 160 has to be large enough so that this processing can take place without interruption during the switching of the video signals. If desired, the system may continue to use the buffer 160 in anticipation of a future switch. By using the microprocessor 108 to manipulate the fill and empty rate of the buffer 160, the buffer 160 may be rapidly filled with video signal B frames and then after a period of time will be reset and ready to make another switch to another video in the same manner. The buffer 160 may also be reset by skipping frames or providing a delay between sequential frame outputs for a short time in order to fill the buffer 160. If a delay is used to maintain video signal or frame output while the buffer 160 is being filled a slight distortion may occur for a brief amount of time.

Because a first video signal is always displayed as the output of the buffer after the delay, the buffered video masks the acquisition and decoding of a second video signal. As long as the buffer is large enough to keep the first video running while the second video is being decompressed and decoded, a seamless switch will occur.

FIG. 4 shows an alternate, dual tuner embodiment for seamless switching between separate video signals. In this embodiment, the microprocessor 108 controls the selection of the RF channel that is demodulated by RF demodulators 102A, 102B. The demodulated data streams enter the forward error correctors 104A, 104B. At the output of the forward error correctors, the data streams are transmitted to the input of the digital demultiplexers 106A, 106B.

As with the RF demodulators 102A, 102B, the digital demultiplexers 106A, 106B are controlled by the microprocessor 108. This configuration allows the microprocessor 108 to independently select two different individual time-multiplexed video signals on different channels and data streams. If all the video signals of an interactive program were contained on a single channel or data stream, it would only be necessary to have a single RF demodulator, forward error corrector, and digital demultiplexer serially connected and feeding into the two digital video buffers.

Two data streams are provided from the digital demultiplexers 106A and 106B. One data stream carries video information pertaining to the video signal the user is currently viewing. The second data stream carries the video signal selected based on the user's previous and/or current interactive selections from the user interface 130, as determined by the microprocessor 108.

The digital information on each of the two streams is buffered in digital video buffers 164, 165. The buffered signals are then decompressed and converted into analog signals by decompressors/decoders 110A, 110B which include digital to analog converters. The decompressors 110A, 110B are preferably MPEG decoders.

A local sync generator 140 is connected to sync add 151, 152 and frame sync 153, 154 circuits. Because both streams are synchronized based on signals from the same local sync generator 140, each stream becomes synchronized to the other. In particular, the signals on each stream are frame synchronized.

A vertical blanking interval (VBI) switch 180 is connected to the microprocessor 108 so that the input may be switched during the vertical blanking interval of the current stream, resulting in a seamless switch to the viewer.

The embodiment of FIG. 4 operates as follows. Based on user responses and control codes, it is assumed that the microprocessor 108 determines that a switch from video signal A to video signal C should be performed. RP demodulator 102A and digital demultiplexer 106A are processing the currently viewed video signal, video signal A, which is progressing through the upper branch components 164, 110A, 151, 153, 180. A command is issued from the microprocessor 108 to the RF demodulator 102B commanding a switch to the channel and data stream on which video signal C is located. The microprocessor 108 also instructs the digital demultiplexer 106B to provide video signal C from the received data stream to digital video buffer 165.

At this point, RF demodulator 102A and digital demultiplexer 106A are still independently receiving and processing video signal A, which continues through the upper branch of the circuit.

At a certain point, the digital decompressor/decoder 110B in the lower branch will begin filling up with video C frames. After the video signal C is decompressed and decoded, it is converted into analog. A local sync generator 140 inserts both local sync and frame sync to video signal C via sync add circuit 152 and frame sync circuit 154 in order to synchronize it with the currently displayed video signal A, which is still being provided from digital video buffer 164. At the appropriate switch point, triggered by programming codes supplied with each video signal A and C, the microprocessor directs the VBI switch 180 to switch in the vertical blanking interval from video A to video C, at which time video C will then seamlessly appear on the television set monitor 10.

Digital video buffers 164 and 165 may be used in the circuit of FIG. 4, but are optional. However, in an alternative embodiment the buffers 164 and 165 would be required to provide a seamless switch if the FIG. 4 circuit was modified to incorporate a single RF demodulator 102, single forward error corrector 104, and single digital demultiplexer 106 (as in FIG. 3), each with a single input and single output. In this alternative embodiment, the circuit cannot independently receive and demultiplex two data streams on different frequency channels. One buffer is used to store previously received video signals, while the other buffer quickly passes through the selected video signals.

Based on the same assumptions above, video signal A is progressing through the upper branch of the circuit and it is desired to switch to video signal C. However, in this alternative embodiment, digital video buffer 164 is providing maximum buffering to video signal A.

Because it is desired to switch to video signal C, microprocessor 108 directs the alternative circuit (containing a single RF receiver 102, single forward error corrector 104 and single digital demultiplexer 106 connected in serial), to receive and demultiplex the data stream on which video signal C is located, which may be different than that of video signal A. When video signal C is demultiplexed, the microprocessor 108 directs digital video buffer 165 to provide minimum buffering of video signal C so that decompressor/decoder 110B may quickly decompress and decode the digital signals. After decompression and decoding, video signal C is synchronized with video signal A. At this time video signal A is read for display from digital video buffer 164. The digital video buffer 164 must be large enough to provide video frames for output during the time it takes the RF demodulator and digital demultiplexer to switch to video signal C and the time required for decompression, decoding, and synchronization of video signal C.

When video signal C is synchronized with video signal A, the microprocessor directs VBI switch 180 to switch from video signal A to video signal C in the vertical blanking interval of video signal A, thereby providing a seamless and flicker-free switch.

At this time, digital video buffer 165 will begin to utilize maximum buffering by altering its fill/empty rate as described above with respect to the FIG. 4 embodiment. When adequate buffering is achieved, a switch to another video signal may be performed in the same manner as described above.

Another preferred embodiment is shown in FIG. 5. This embodiment also includes an RF demodulator 102, a forward error corrector 104, and a digital demultiplexer 106. However, the circuitry differs along the rest of the chain to the television set or monitor 10. In this embodiment, a large memory 190 is incorporated and connected to the output of the demultiplexer 106 for storing the compressed composite digital video signal. The decompressor/decoder 110 is inserted at the output of the compressed memory 190. The decompressor/decoder 110 decompresses the digital signal, converts the signal to analog and forwards the analog signal to the RF encoder 170 for transmission to the monitor 10. Once the composite compressed digital video signal is fed into the compressed memory 190, the microprocessor 108 directs a pointer to be placed somewhere along the compressed digital video signal. Based on the placement of the pointer, different frames and different segments of the composite digital video signal will be read from memory 190 for decompression and decoding.

The different video signals are distinguished from one another because they are labeled, preferably by headers. Assuming that video signal A has been selected for play on the monitor 10, the compressed digital memory 190 fills up with A frames. Assuming a switch to video signal C is desired, the microprocessor 108 directs the RF demodulator 102 and digital demultiplexer 106 to begin filling the compressed memory 190 with video C frames. The decoder pointer begins to move down. As soon as a sufficient number of C frames have entered the compressed memory 190, the pointer will then jump to the beginning of the C frames. The C frames are then output into the decompressor/decoder 110 where the digital frames are converted into an analog signal.

The digital video is multiplexed in a series of easily identifiable packets. These packets may contain full compressed frames of video (I frames) or may include only the differences between full frames (B frames or P frames). To be able to reconstruct the full video images, the decompressor/decoder 110 needs to have a minimum number of I, P and B frames. In this embodiment the buffer memory 190 is filled with compressed packets from a given stream of data including I, B and P frames. When the microprocessor 108 instructs the digital demux 106 to start sending packets from a different data stream there is no way to be certain that the next packet will be an I packet needed for decoding the second video stream. To avoid a breakup of the video images, which would occur if the decompressor, decoder 110 suddenly started receiving packets unrelated to the stream it was decoding, the microprocessor 108 starts to fill up the memory 190 with video signal C packets until it is determined that a full sequence of I, B and P frames are available. As soon as the valid sequence is in memory the microprocessor 108 moves the memory read pointer to the start of a valid sequence of C video signal packets so that the decompressor decoder can successfully decode the C signals. This results in a seamless switch from video signal A to video signal C.

This embodiment requires a data channel for enabling a synchronous switch between a first video stream and a second video stream. This data channel comprises the ACTV codes which link together the different program elements and information segments on the different video signals. In addition, the data channel also comprises synchronization pulses and a time code to signify to the pointer the proper time to skip from a memory location representing one video signal to a memory location representing another video signal in order to enable a seamless switch.

The microprocessor 108 reads the data signal from the digital demultiplexer 106 and communicates pertinent data to the sync add circuit 150, which is connected to sync generator 140. The microprocessor 108 is then able to synchronously communicate with the memory 190.

The time code sent will identify the timing for one picture, as well as for multiple pictures, and will lock the different pictures together. This is done through the use of similar clocks at both the transmission end and the receiver. A time code is used in order to keep the two locks at both the transmission and receive end synchronously connected to one another. Once the clocks at both ends are working synchronously, each of the multiplexed video streams must be synchronized to the clocks. In order to synchronize the multiplexed video stream to the clocks, each of the individual channels must be referenced to a common reference point and must be identified.

In the preferred embodiment, a packet header would be incorporated into the transport layer of the MPEG signal to identify the various channels. The packet header will also include information as to where to insert the vertical blanking interval. in MPEG, the vertical blanking interval is not transmitted from the headend. Therefore, the vertical blanking interval must be generated locally. The packet header eye will identify at what time the vertical blanking interval is in existence in order to effectuate a seamless switch between analog pictures.

In summary, the combination of clock and the information imbedded in either the transport layer of MPEG or in a separate packet on a separate data channel effectuates the linking between each video signal and a corresponding time point. The data channel also includes information designating when all the various video signals will be in synchronism with one another. It is at these points that the microprocessor 108 may direct the pointer to skip from one location to another location, at a time (such as during the VBI) when a seamless switch will result.

FIG. 6 shows a method to use the memory 190 described with respect to FIG. 5. FIG. 6 shows a timed sequence of video signals that are stored in the memory 190. In FIG. 6, the decompressor/decoder 110 requires, for example, five specific video frames before decompressing and decoding can begin. Specifically, the decompressor/decoder 110 requires frames A,a,a,a,A, B,b,b,b,B, or C,c,c,c,C, and so forth. Because of the MPEG compression algorithm used, certain frames of video signals (represented by the lower-case letters) cannot be decoded and decompressed without utilizing information within certain other compressed frames (represented by uppercase letters).

At time T0 the viewer is watching channel A, the memory is filled with frames relating to channel A, and the pointer is pointing to frame $A_1$. At time T1, $A_1$ has been output to the decompressor/decoder 110 and the microprocessor 108 has switched to channel C. As with a buffer, the memory contents are shifted so that new data $c_1$ is stored and data $a_2$ is ready for output to the decompressor/decoder 110, because the pointer is located at $a_2$. At this point in time, the microprocessor 108 is monitoring the data as it arrives to determine when data relating to channel C is present. At time T2, $c_2$ is stored, and the memory contents are shifted so that $a_3$ is ready for output. At time T3, $C_3$ is read into the memory and the contents are again shifted so that $a_4$ is ready for output. The pointer position is unchanged.

At time T4, compressed video signal $c_4$ is stored. The $A_5$ frame is presented for output at the pointer location. At time T5, $c_5$ is stored, while the data is again shifted and $a_6$ is ready for output.

In this example, the microprocessor 108 immediately recognizes channel C data $c_6$ and $C_7$ at times T6 and T7, and continues to shift the data in memory without moving the pointer. Therefore, channel A data frames $a_7$ and $A_8$ are output to the decompressor/decoder 110. At time T8, there is enough channel C data to begin a decoding sequence, assuming that the decompressor/decoder 110 requires three frames (c,c,c) which reference two frames (C,C) for decompression and decoding purposes. Therefore, at time T8, the pointer is moved to point to frame $C_3$, which will be the next frame output to the decompressor/decoder 110. Frame $C_3$ is used in the decompression and decoding of one or more of frames $C_4$, $C_5$, and $C_6$.

Rather than outputting the compressed video signals individually, the group of $C_3$, $c_4$, $c_5$, $c_6$, and $C_7$ may be output to the decompressor/decoder 110 at once. This is the preferable technique where $C_7$ is required to decode preceding frames (i.e. $c_4$, $c_5$ or $c_6$).

As with the examples described previously and shown in FIGS. 3 and 4, the buffer may alter its fill and empty rates to provide maximum buffering. If this is performed, the pointer will be reset to its original position, as shown in FIG. 6 at time Tn.

Using FIGS. 3–6, and the previous description of memories and buffers, the artisan will be able to provide a seamless switch for flicker-free switching between interactive channels of the interactive television system of this invention. Other variations using the above schemes are also possible, as realized by the artisan of ordinary skill.

Although the present invention has been described in detail with respect to certain embodiments and examples, variations and modifications exist which are within the scope of the present invention as defined in the following claims.

What is claimed is:

1. An interactive television system comprising:
    a television programming transmission means for providing transmitted interactive television programming, comprising a means for representing said transmitted interactive television programming in the format of a plurality of interactive television program signals placed at different communication frequencies;
    each of said plurality of interactive television program signals comprising a plurality of compressed digital multi-information packets, each packet containing a plurality of time multiplexed program information message signals;
    a subscriber distribution network connected to the television programming transmission means;
    a plurality of subscriber television reception systems connected to the subscriber distribution network, each of said subscriber television reception systems comprising:

a television receiver having a plurality of television reception frequencies some of which correspond to the different communication frequencies and comprising a means for independently receiving any of said program information message signals on the corresponding communication frequencies;

a multi-information selection means for selecting one of said program information message signals comprising:

a means for demultiplexing said selected program information message signal;

a means for decompressing said selected program information message signal;

a means for displaying said selected program information message signal, wherein the transition on the displaying means to said selected program information signal from a previous program information signal is without a visually perceptible delay;

wherein subscribers in said interactive television system independently select and view said interactive television programming.

2. An interactive television system according to claim 1 wherein said multi-information packets comprise one or more regular television program signals.

3. An interactive television system according to claim 1 wherein said subscriber distribution network is selected from the group consisting of cable television, telephone, broadcast television, and direct broadcast satellite.

4. An interactive television system according to claim 1 wherein said multi-information selection means comprises keyboard means comprising a plurality of keys for selectably enabling reception and selection of a program information message signal on a communication frequency corresponding to a selected key and the corresponding communication frequencies.

5. An interactive television system according to claim 4 wherein said multi-information packets comprise video information displayable on said television receiver corresponding to information labels to be dynamically assigned to said keys for a particular multi-information packet, said information labels dynamically variable dependent on the content of said particular multi-informational packet.

6. An interactive television system according to claim 1 wherein at least a portion of said program information message signals are content related in a decision tree relationship between successive individual packets.

7. An interactive television system according to claim 1 wherein at least two of said program information message signals comprise different field synchronized camera angles of the same event.

8. An interactive television system comprising:

a means for receiving user selections;

a means for receiving digitally compressed interactive television programming, the interactive television programming comprising a plurality of video signals related in time and content;

a means, connected to the receiving means, for providing selected video signals, the selected video signals based on the user selections;

a means, connected to the providing means, for outputting an analog signal, comprising:

means for decompressing, buffering, and synchronizing the selected video signals;

a means, connected to the decompressing, buffering, and synchronizing means, and connected to the providing means, for controlling the buffering means, resulting in seamless switch between video signals when the providing means selects another video signal based on a user selection;

a means, connected to the decompressing, buffering, and synchronizing means, for encoding the synchronized analog video signal into a format compatible with a television display; and wherein the encoded signal is related to the user's selections and the user may interactively and seamlessly switch between video signals a and the seamless switch between the video signals results in a transition on a display without a visually perceptible delay.

9. A interactive television system comprising:

a receiver for receiving a program which is filmed using multiple cameras situated at various camera viewpoints, the broadcast program having a plurality of digital video signals, wherein the plurality of digital video signals corresponds to the various camera viewpoints;

a display unit to display the selected channel, the switch from one channel to the selected channel a seamless digital switch the seamless digital switch resulting in a transition to the selected channel without a visually perceptible delay; and a remote controller remotely coupled to the display unit, the remote controller for selecting corresponding digital video signals to thereby choose a desired camera viewpoint.

10. The interactive television system of claim 9, wherein the digital video signals are digitally compressed and the interactive television system further comprises a decompressor/decoder, connected to the receiver, for decompressing the digitally compressed video signals.

11. The interactive television system of claim 10, wherein the compressed digital video signals are multiplexed and the interactive television system further comprises a demultiplexer for demultiplexing the compressed digital video signals.

12. The interactive television system of claim 9, wherein one of the digital video signals contains a standard broadcast signal of the event.

13. The interactive television system of claim 9, wherein one of the digital video signals contains a close-up view of the event.

14. The interactive television system of claim 9, wherein one of the digital video signals contains a continuously updated view of event highlights.

15. The interactive television system of claim 9, wherein one of the digital video signals contains statistical information.

16. The interactive television system of claim 11, wherein the multiplexed digital video signals are transmitted over a single cable channel.

17. The interactive television system of claim 9, wherein the digital video signals are transmitted over a cable television system.

18. The interactive television system of claim 9, wherein the digital video signals are transmitted over a broadcast television system.

19. The interactive television system of claim 9, wherein the digital video signals are transmitted over a direct broadcast satellite.

20. The interactive television system of claim 11, wherein the digital video signals are transmitted over a six MHz NTSC channel.

21. The interactive television system of claim 11 further comprising a head end operably connected to the receiver, the remote controller generating unique camera control signals indicative of and corresponding to the multiple camera viewpoints and transmitting them to the display unit, the display unit sending the camera control signal to the head end, the head end seamlessly switching among the digital video signals selected by the remote controller.

22. The interactive television system of claim 9 wherein the head end stores the digital video signals from the corresponding cameras.

23. The interactive television system of claim 9, wherein a personal profile is created and the interactive television system further comprises a memory for storing the personal profile, and wherein the desired camera viewpoint is selected based on the viewer profile.

24. A method for providing live interactive digital television, comprising the steps of:
- obtaining video signals from a plurality of video cameras, one or more of the cameras relaying a different view of an event;
- digitally encoding one or more of the video signals;
- transmitting the digital video signals;
- receiving the combined digital program stream;
- gathering a viewer selection from a remote controller;
- seamlessly switching to the selected digital video signal, wherein the seamless switch results in a transition to the selected digital video signal without a visually perceptible delay; and
- displaying the selected video signal on a screen.

25. The method of claim 24 further comprising the step of digitally compressing the video signals.

26. The method of claim 24 further comprising the step of digitally multiplexing the video signals into a combined digital program stream.

27. The method of claim 24 further comprising the step of digitally demultiplexing the digital video signals.

28. The method of claim 24 further comprising the step of decompressing the demultiplexed digital video signals.

29. The method of claim 24, further comprising the steps of:
- creating a personal profile;
- storing the personal profile; and
- wherein selecting the video signals are based in part on the personal profile.

30. The interactive television system of claim 24, wherein one of the digital video signals contains a standard broadcast signal of the event.

31. The interactive television system of claim 24, wherein one of the digital video signals contains a close-up view of the event.

32. The interactive television system of claim 24, wherein one of the digital video signals contains a continuously updated view of event highlights.

33. The interactive television system of claim 24, wherein one of the digital video signals contains statistical information.

34. The interactive television system of claim 26, wherein the multiplexed digital video signals are transmitted over a single cable channel.

35. The interactive television system of claim 24, wherein the digital video signals are transmitted over a cable television system.

36. The interactive television system of claim 24, wherein the digital video signals are transmitted over a broadcast television system.

37. The interactive television system of claim 24, wherein the digital video signals are transmitted over a direct broadcast satellite.

38. The interactive television system of claim 24, wherein the digital video signals are transmitted over a six MHz NTSC channel.

39. A interactive television system comprising:
- a receiver for receiving a broadcast program which is filmed using multiple cameras situated at various camera viewpoints, the broadcast program having a plurality of digital video signals, wherein the plurality of digital video signals corresponds to the various camera viewpoints;
- a remote controller for receiving a viewer entry;
- a signal selector, connected to the receiver and remotely coupled to the remote controller, for selecting one of the digital video signals and directing a seamless switch to the selected video signal based on the viewer entry, wherein the seamless switch results in a transition to the selected video signal without a visually perceptible delay; and
- a monitor to display the selected video signal.

40. The interactive television system of claim 39, wherein the digital video signals are digitally compressed and the interactive television system further comprises a decompressor/decoder, connected to the receiver, for decompressing the digitally compressed video signals.

41. The interactive television system of claim 40, wherein the compressed digital video signals are multiplexed and the interactive television system further comprises a demultiplexer for demultiplexing the compressed digital video signals.

42. The interactive television system of claim 39, wherein one of the digital video signals contains a standard broadcast signal of the event.

43. The interactive television system of claim 39, wherein one of the digital video signals contains a close-up view of the event.

44. The interactive television system of claim 39, wherein one of the digital video signals contains a continuously updated view of event highlights.

45. The interactive television system of claim 39, wherein one of the digital video signals contains statistical information.

46. The interactive television system of claim 41, wherein the multiplexed digital video signals are transmitted over a single cable channel.

47. The interactive television system of claim 39, wherein the digital video signals are transmitted over a cable television system.

48. The interactive television system of claim 39, wherein the digital video signals are transmitted over a broadcast television system.

49. The interactive television system of claim 39, wherein the digital video signals are transmitted over a direct broadcast satellite.

50. The interactive television system of claim 41, wherein the digital video signals are transmitted over a six MHz NTSC channel.

51. The interactive television system of claim 39 further comprising a head end operably connected to the receiver, the remote controller generating unique camera control signals indicative of and corresponding to the multiple camera viewpoints and transmitting them to the monitor, the monitor sending the camera control signal to the head end, the head end seamlessly switching among the digital video signals selected by the remote controller.

52. The interactive television system of claim 39 wherein the head end stores the digital video signals from the corresponding cameras.

53. The interactive television system of claim 39, wherein a personal profile is created and the interactive television system further comprises a memory for storing the personal profile, and wherein the desired camera viewpoint is selected based on the viewer profile.

54. An apparatus for seamlessly switching between digital video signals, comprising:
- a receiver interface, the receiver interface receiving a plurality of digital video signals;
- a processor, the processor selecting a video signal for display; and
- a seamless video switch, connected to the processor, the switch seamlessly switching from a previously displayed digital video signal to the selected video signal the seamless switch resulting in a transition to the selected video signal without a visually perceptible delay.

55. The apparatus of claim 54, the apparatus further comprising a digital display monitor for displaying the selected video signal.

56. The apparatus of claim 54, the apparatus further comprising a user interface for receiving subscriber selections and wherein the processor selects the video signal based on one or more subscriber selections.

57. The apparatus of claim 54, the apparatus further comprising a memory, connected to the processor, for storing personal information, wherein the processor selects the video signal based on the personal profile information.

58. The apparatus of claim 54, wherein the plurality of digital video signals are multiplexed and the seamless video switch comprises:
- a demultiplexer, connected to the processor, the demultiplexer demultiplexes the plurality of digital video signals to obtain the selected video signal;
- a decompressor, operably connected to the demultiplexer, for decompressing the selected video signal.

59. The apparatus of claim 58, the seamless video switch further comprising a memory for storing the selected video signal.

60. The apparatus of claim 54, wherein the plurality of digital videos signals are multiplexed and the seamless video switch comprises:
- a demultiplexer, connected to the processor, the demultiplexer demultiplexes the plurality of digital video signals;
- a memory, connected to the demultiplexer, for storing the demultiplexed video signals, the memory containing a pointer under microprocessor control which identifies the memory contents to be output;
- a decompressor, connected to the memory, for decompressing the stored video signals; and
- a synchronizing means, for generating synchronization pulses.

61. An apparatus for seamlessly switching between digital video signals, comprising:
- a receiver interface, the receiver interface receiving a plurality of digital video signals and program data codes;
- a user interface for receiving subscriber selections;
- a processor, in communications with the user interface, for selecting a video signal for display, wherein the selection of the video signal is based on the program data codes and on one or more subscriber selections; and
- a seamless video switch, connected to the processor and the receiver interface, the switch receiving an instruction from the processor identifying the selected video signal, and the switch seamlessly switches from a previously displayed digital video signal to the selected video signal, wherein the seamless switch results in a transition to the selected video signal without a visually perceptible delay.

62. The apparatus of claim 61, wherein the plurality of digital video signals are multiplexed and the seamless video switch comprises:
- a demultiplexer, connected to the processor, the demultiplexer demultiplexes the plurality of digital video signals to obtain the selected video signal; and
- a decompressor, operably connected to the demultiplexer, for decompressing the selected video signal.

63. The apparatus of claim 61, the apparatus further comprising a digital display monitor for displaying the selected video signal.

64. A method for seamlessly switching between video signals, comprising the steps of:
- receiving a plurality of digital video signals;
- selecting a video signal for display with a processor;
- seamlessly switching from a previously displayed digital video signal to the selected video signal, wherein the seamless switch results in a transition to the selected video signal without a visually perceptible delay;
- displaying the selected video signal.

65. A method for seamlessly switching between digital video signals, comprising the steps of:
- receiving a plurality of digital video signals and program data codes;
- gathering subscriber selections;
- selecting a video signal for display with a processor, wherein the selection of the video signal is based on the program data codes and on one or more subscriber selections; and
- receiving an instruction at a digital switch from the processor identifying the selected video signal; and
- seamlessly switching from a previously displayed digital video signal to the selected video signal, wherein the seamless switch results in a transition to the selected video signal without a visually perceptible delay.

66. An apparatus for seamlessly switching between digital video signals, comprising:
- a receiver interface, the receiver interface receiving a plurality of digital video signals;
- a memory for storing personal profile information;
- a processor, in communications with the user interface, for selecting a video signal for display, wherein the selection of the video signal is based on the personal profile information; and
- a seamless video switch, connected to the processor and the receiver interface, the switch receiving an instruction from the processor identifying the selected video signal, and the switch seamlessly switches from a previously displayed digital video signal to the selected video signal, wherein the seamless switch results in a transition to the selected video signal without a visually perceptible delay.

67. The apparatus of claim 66, the apparatus further comprising a digital display monitor for displaying the selected video signal.

68. An apparatus for seamlessly switching between a first digital video signal and a second video signal, comprising:

a processor, the processor selects the second video signal for display;

a digital demultiplexer, the digital demultiplexer demultiplexes the plurality of digital video signals to obtain the second video signal;

a decompressor, connected to the digital demultiplexer, the decompressor decompresses the second video signal;

a video buffer, connected to the decompressor and processor, for buffering the first video signal, wherein the first signal is buffered to ensure correct alignment with the selected second video signal so that switching from the first digital video signal to the second digital video signal is without a visually perceptible delay; and a display monitor, connected to the video buffer, for displaying the video signals.

69. The apparatus of claim 68, further comprising a memory, connected to the processor, for storing personal profile information, wherein the selection of the second video signal is based on the personal profile information.

70. The apparatus of claim 68, the apparatus further comprising a user interface for receiving user inputs, wherein the selection of the second video signal is based on one or more use input responses.

71. The apparatus of claim 68, wherein the video buffer is a digital video buffer.

72. The apparatus of claim 68, the apparatus further comprising a decoder, connected to the decompressor, for decoding the second video signal from digital to analog, wherein the video buffer is an analog video buffer.

* * * * *

UNITED STATES PATENT AND TRADEMARK OFFICE
CERTIFICATE OF CORRECTION

PATENT NO. : 6,181,334 B1
DATED : January 30, 2001
INVENTOR(S) : Michael J. Freeman and Gregory W. Harper It is certified that error appears in the above-identified patent and that said Letters Patent is hereby corrected as shown below:

<u>Column 18,</u>
Line 23, please insert -- , -- between the first occurrence of the word "switch" and the word "the".

Signed and Sealed this

Twenty-fourth Day of September, 2002

Attest:

Attesting Officer

JAMES E. ROGAN
*Director of the United States Patent and Trademark Office*